US012770003B2

(12) United States Patent
Cho

(10) Patent No.: US 12,770,003 B2
(45) Date of Patent: Oct. 20, 2026

(54) APPARATUS AND METHOD FOR OPTIMIZING ARTIFICIAL INTELLIGENCE MODEL LOADING IN EMBEDDED ENVIRONMENT

(71) Applicant: Deep ET, Gwangjin-gu (KR)

(72) Inventor: Yong Beom Cho, Gangnam-gu (KR)

(73) Assignee: Deep ET, Seoul (KR)

( * ) Notice: Subject to any disclaimer, the term of this patent is extended or adjusted under 35 U.S.C. 154(b) by 466 days.

(21) Appl. No.: 18/399,060

(22) Filed: Dec. 28, 2023

(65) Prior Publication Data

US 2024/0330683 A1 Oct. 3, 2024

(30) Foreign Application Priority Data

Mar. 30, 2023 (KR) ........................ 10-2023-0041746
Jul. 13, 2023 (KR) ........................ 10-2023-0091243

(51) Int. Cl.
*G06N 3/08* (2023.01)

(52) U.S. Cl.
CPC ...................................... *G06N 3/08* (2013.01)

(58) Field of Classification Search
CPC ........................................................ G06N 3/08
USPC ............................................................ 706/25
See application file for complete search history.

(56) References Cited

U.S. PATENT DOCUMENTS 12,609,905 B1 * 4/2026 Cai ......................... H04L 41/16
2023/0019211 A1 1/2023 Wang et al.

FOREIGN PATENT DOCUMENTS

JP 2023007419 A 1/2023
KR 102067994 B1 1/2020
KR 1020220119883 A 8/2022

OTHER PUBLICATIONS

"Deep deterministic policy gradient algorithm: A systematic review" Published by Heliyon (Year: 2024).*
Reinforcement Learning with Deep Deterministic Policy Gradient published by IEEE (Year: 2021).*
Office Action issued on Feb. 8, 2024, in corresponding Korean Patent Application No. 10-2023-0091243. (7 pages).

* cited by examiner

*Primary Examiner* — Zeina Elchanti
(74) *Attorney, Agent, or Firm* — Buchanan Ingersoll & Rooney PC

(57) ABSTRACT

The invention discloses a loading optimization device and method for artificial intelligence models in an embedded environment. According to an embodiment of the present invention, the loading optimization method for artificial intelligence models in an embedded environment includes steps such as acquiring model information for the target model based on artificial intelligence, defining multiple partition scenarios for splitting the target model into multiple blocks based on the model information, and considering memory information of a computing device for executing the target model and computational workload information associated with the target model to explore the optimal scenario among the multiple partition scenarios through a reinforcement learning-based loading optimization model.

15 Claims, 5 Drawing Sheets

【FIG. 1】
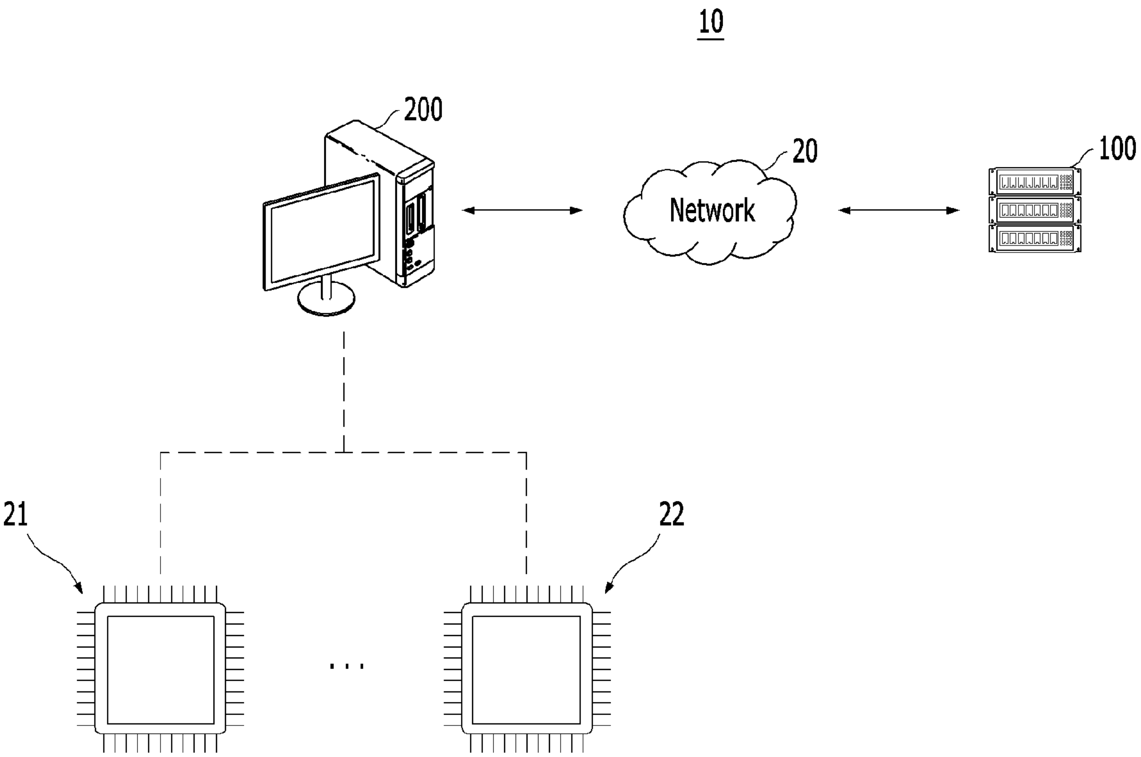

【FIG. 2】
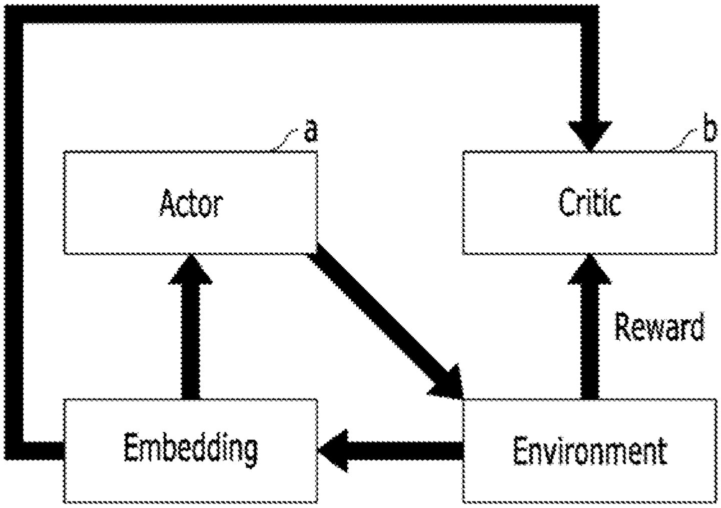

【FIG. 3】
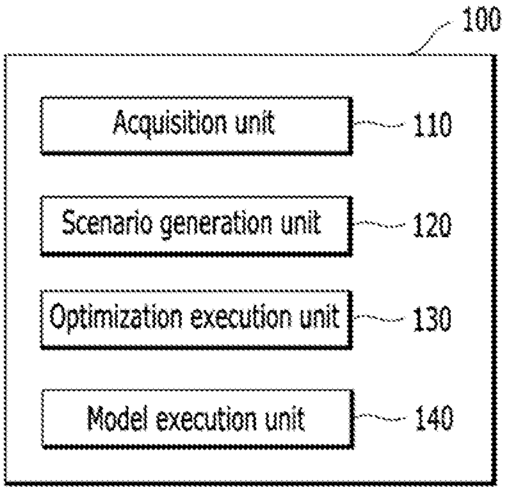

【FIG. 4】
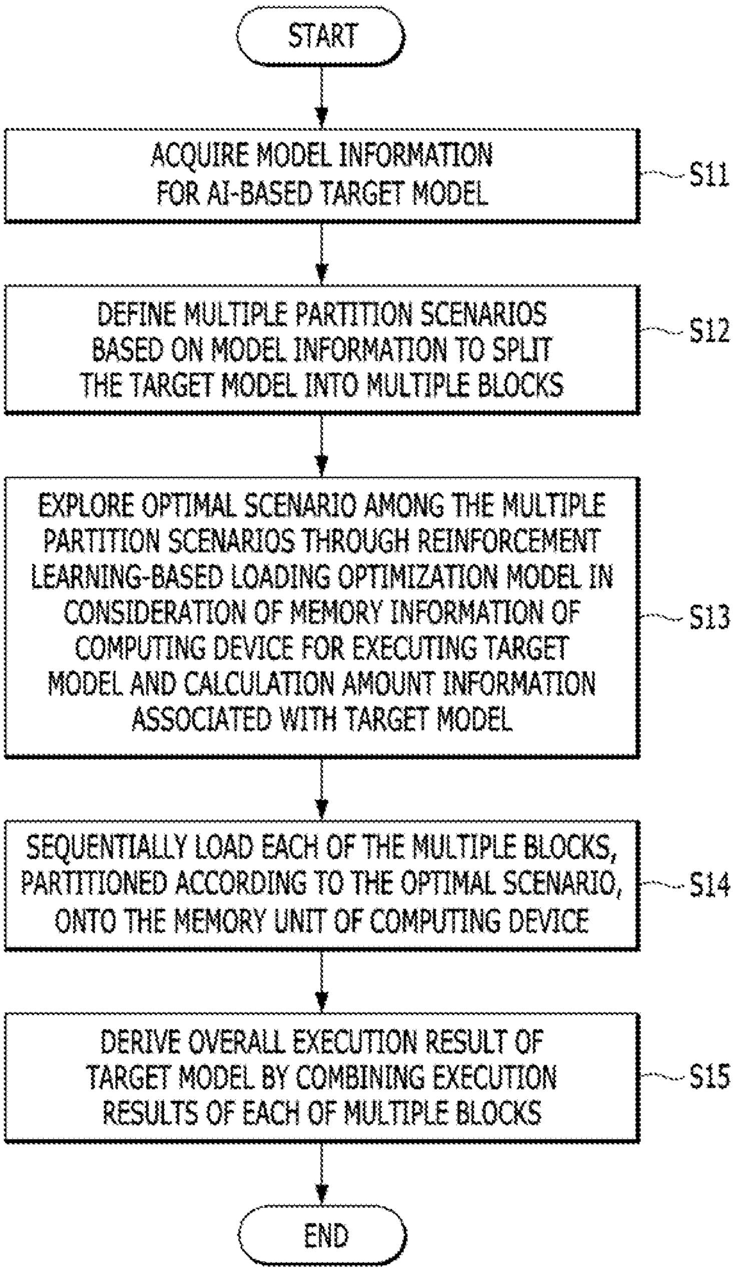

【FIG. 5】
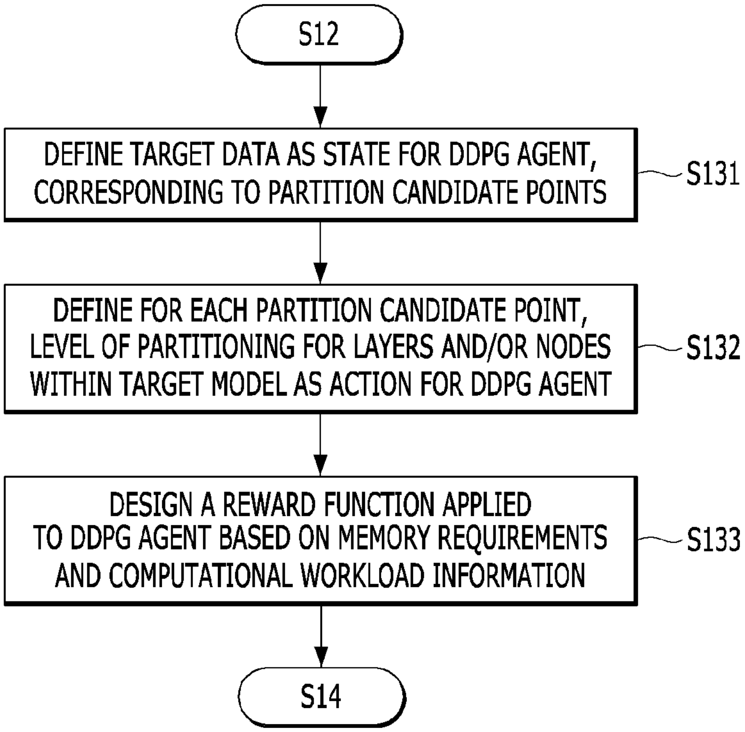

APPARATUS AND METHOD FOR OPTIMIZING ARTIFICIAL INTELLIGENCE MODEL LOADING IN EMBEDDED ENVIRONMENT

TECHNICAL FIELD

The present disclosure relates to a loading optimization device and method for artificial intelligence models in an embedded environment. For example, it pertains to reinforcement learning-based optimization techniques for efficient deep learning model loading in embedded environments.

DESCRIPTION OF THE RELATED ART

Deep Learning is a type of machine learning that utilizes multi-layer neural networks. Neural network algorithms used in deep learning include Convolutional Neural Network (CNN), Recurrent Neural Network (RNN), Deep Belief Network (DBN), Generative Adversarial Network (GAN), Relation Networks (RL), and Deep Neural Network (DNN). Deep learning frameworks provide validated libraries and pre-trained models for various deep learning algorithms, allowing engineers to develop core algorithms for problem-solving by using these resources.

In this context, the process of building a deep learning model can be broadly divided into the training phase, where a neural network model is created through learning from collected data, and the inference phase, where real data is input to make predictions based on the trained model. The training process involves performing repeated computations over an extended period using vast amounts of data, demanding rapid processing power and substantial memory. In contrast, the operational environment using real data requires more computations and memory compared to typical applications but generally involves a relatively lower level of computational and memory requirements compared to the training phase.

On the practical application front, there is a trend towards employing frameworks that are efficient in execution rather than focusing solely on models that emphasize computations during the development stage. This shift is driven by constraints such as physical size and power limitations in operational environments.

Particularly in embedded environments, the limited memory size has been a significant challenge, making it difficult to effectively load large deep learning models.

The technology underlying this invention is disclosed in Korean Patent Publication No. 10-2067994.

DISCLOSURE

Technical Problem

The present invention aims to address the drawbacks of the mentioned prior art. It is intended to provide a loading optimization device and method for artificial intelligence models in embedded environments. The approach involves partitioning a deep learning model into multiple blocks and optimizing the loading of these partitioned blocks to comply with the memory constraints of each embedded environment.

However, the technical challenges that the embodiments of the present disclosure seek to address are not limited to the aforementioned technical challenges but there may be additional technical challenges.

Technical Solution

As a technical means to achieve the aforementioned technical challenges, a loading optimization method for artificial intelligence models in an embedded environment according to one embodiment of the present disclosure involves acquiring model information for the artificial intelligence-based target model, defining multiple partition scenarios based on the model information to partition the target model into multiple blocks, and exploring the optimal scenario among the multiple partition scenarios using a reinforcement learning-based loading optimization model, taking into account the memory information of the computing device for executing the target model, and computational requirements associated with the target model.

Furthermore, the loading optimization model can be trained based on a DDPG (Deep Deterministic Policy Gradient) agent.

Moreover, the step of defining multiple partition scenarios may involve identifying potential partition points for the target model based on the model information and collecting target data for the potential partition points, including computational and memory requirements associated with those points.

Furthermore, the step of exploring the optimal scenario may involve determining the optimal scenario as the partition scenario where the memory requirements for each of the multiple blocks correspondingly satisfy the constraint conditions based on the memory information and the total computational requirements of the target model are minimized.

Furthermore, the step of exploring the optimal scenario may include defining the target data as the state for the DDPG agent, corresponding to the potential partition points, and defining the partition levels of layers and/or nodes included in the target model for each potential partition point as actions for the DDPG agent.

Moreover, the reward function applied to the DDPG agent can be designed based on the memory requirements and computational information.

Furthermore, the loading optimization method for artificial intelligence models in an embedded environment according to one embodiment of the present disclosure may include the step of sequentially loading each of the multiple blocks, partitioned according to the optimal scenario, into the memory units of the computing device. Additionally, it may involve combining the execution results of each of the multiple blocks to derive the overall execution result of the target model.

Moreover, the computing device may be a device operating in an embedded platform environment.

Meanwhile, the loading optimization device for artificial intelligence models in an embedded environment according to one embodiment of the present disclosure may include a acquisition unit to acquire model information for the artificial intelligence-based target model, a scenario generation unit to define multiple partition scenarios based on the model information for partitioning the target model into multiple blocks, and an optimization execution unit to explore the optimal scenario among the multiple partition scenarios using a reinforcement learning-based loading optimization model, taking into account the memory information of the computing device for executing the target model and the computational requirements associated with the target model.

Furthermore, the scenario generation unit may identify potential partition points for the target model based on the model information and collect target data for the potential partition points, including computational and memory requirements associated with those points.

Moreover, the optimization execution unit may determine the optimal scenario as the partition scenario where the memory requirements for each of the multiple blocks correspondingly satisfy the constraint conditions based on the memory information, and the total computational requirements of the target model are minimized.

Furthermore, the optimization execution unit may define the target data as the state for the DDPG agent, corresponding to the potential partition points, and define the partition levels of layers and/or nodes included in the target model for each potential partition point as actions for the DDPG agent.

Additionally, the loading optimization device for artificial intelligence models in an embedded environment according to one embodiment of the present disclosure may include a model execution unit that sequentially loads each of the multiple blocks, partitioned according to the optimal scenario, into the memory units of the computing device. It may further involve combining the execution results of each of the multiple blocks to derive the overall execution result of the target model.

The means of addressing the described challenges are merely illustrative and should not be construed as an intent to limit the scope of the invention. In addition to the illustrative embodiments described, there may be additional embodiments in the drawings and detailed description of the invention.

The Advantages of the Invention

According to the means of addressing the challenges in the present disclosure, a loading optimization device and method for artificial intelligence models in an embedded environment can be provided. This involves partitioning a deep learning model into multiple blocks and efficiently loading the partitioned blocks to meet the memory constraints of each embedded environment.

By the means described in the present disclosure, it is possible to efficiently load a deep learning model in an embedded environment by partitioning it into multiple blocks, considering the constraints of limited memory size. The use of the reinforcement learning algorithm DDPG (Deep Deterministic Policy Gradient) allows learning an appropriate partitioning strategy based on the model structure.

Through the means of addressing the challenges in the present disclosure, it becomes possible to execute large deep learning models in small, embedded environments. This allows the application of deep learning technology using devices with limited memory and computational capabilities.

By the means described in the present disclosure, it is possible to overcome memory limitations in embedded environments and efficiently load and execute deep learning models.

By employing the DDPG algorithm, the means described in the present disclosure enable learning the optimal partitioning method considering the model's structure and the memory constraints of the embedded environment. This allows for maximizing the utilization of system resources, enabling the application of deep learning technology on devices with limited memory and computational capabilities in various fields.

However, the benefits obtainable from the present disclosure are not limited to the aforementioned effects, and there may be additional benefits as well.

BRIEF DESCRIPTION OF THE DRAWINGS

FIG. 1 provides a schematic overview of an artificial intelligence-based computing system, including a loading optimization device for artificial intelligence models in an embedded environment, according to one embodiment of the present disclosure.

FIG. 2 illustrates a diagram exemplifying the Actor-Critic structure of a DDPG (Deep Deterministic Policy Gradient) agent for training the loading optimization model.

FIG. 3 provides a schematic overview of the loading optimization device for artificial intelligence models in an embedded environment according to one embodiment of the present disclosure.

FIG. 4 illustrates the operational flowchart of the loading optimization method for artificial intelligence models in an embedded environment according to one embodiment of the present disclosure.

FIG. 5 depicts a detailed operational flowchart for the process of constructing a reinforcement learning-based loading optimization model.

DETAILED DESCRIPTION OF THE EMBODIMENT

Hereinafter, the present disclosure will be described more fully with reference to the accompanying drawings, in which exemplary embodiments of the present disclosure are shown. However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is "coupled" to another element, the element may be "directly coupled" to the other element or "electrically coupled" or "indirectly coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

Through the specification of the present disclosure, unless explicitly described to the contrary, the word "comprise" and variations such as "comprises" or "comprising", will be understood to imply the inclusion of stated elements but not the exclusion of any other elements.

The present disclosure relates to a processing apparatus for a neural network calculation and a method for operating the same, and more particularly, to a neural processing unit having a structure with a memory which stores a weight of a neural network added thereto.

FIG. 1 provides a schematic overview of an artificial intelligence-based computing system, including a loading optimization device for artificial intelligence models in an embedded environment, according to one embodiment of the present disclosure.

Referring to FIG. 1, an artificial intelligence-based computing system (10) according to one embodiment of the present disclosure may include a loading optimization device for artificial intelligence models in an embedded environment (100, hereinafter referred to as 'loading optimization device (100)'), and a computing device (200).

The optimization device (100) and computing device (200) can communicate with each other through a network (20). The network (20) represents a connected structure allowing information exchange between nodes, such as terminals and servers. Examples of such a network (20) include, but are not limited to, 3GPP (3rd Generation Partnership Project) networks, LTE (Long Term Evolution) networks, 5G networks, WIMAX (World Interoperability for Microwave Access) networks, the Internet, LAN (Local Area Network), Wireless LAN (Wireless Local Area Network), WAN (Wide Area Network), PAN (Personal Area Network), WiFi networks, Bluetooth networks, satellite broadcast networks, analog broadcast networks, DMB (Digital Multimedia Broadcasting) networks, and the like.

The computing device (200) may include various types of wireless communication devices, such as smartphones, smartpads, tablet PCs, and personal communication systems (PCS), GSM (Global System for Mobile communication), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), Wibro (Wireless Broadband Internet) terminals, and the like. Specifically, in the present disclosure, the computing device (200) may refer to IoT devices, edge devices, embedded boards, and the like operating in an embedded environment.

In other words, the computing device (200) in the present disclosure may refer to devices operating in an embedded environment. In this context, the recent emergence of embedded devices equipped with Graphics Processing Units (GPUs) has enabled high-speed parallel computing, meeting the increasing demand for implementing deep neural networks in embedded environments that require substantial computational power. However, traditional artificial intelligence frameworks have been primarily focused on utilizing abundant parallel computing resources in computing environments with sufficient resources and performance, such as desktop or server environments, making it challenging to directly apply them to embedded environments where real-time performance, low power consumption, and minimal memory usage are crucial for inference.

On the other hand, in FIG. 1, the optimization device (100) is illustrated as being independently equipped with the computing device (200). However, this is not limited to this configuration. Depending on the implementation in the present disclosure, the optimization device (100) may be integrated as a sub-component (module) of the computing device (200) to accelerate the operations of artificial intelligence models using processing units (computational units) equipped in the computing device (200). This integration may involve applying optimization techniques (such as ARM Neon optimization, sophisticated memory management, and data structure design) disclosed in the present disclosure, forming an artificial intelligence-based computational system (10).

Additionally, referring to FIG. 1, the computing device (200) may be equipped with a processing unit (21) and a memory unit (22). Although not explicitly depicted in the drawing, the processing unit (21) of the computing device (100) can have a multi-core structure including a first processing unit (not shown) and a second processing unit (not shown). For example, the first processing unit (not shown) may include a Central Processing Unit (CPU), and the second processing unit (not shown) may include a Field Programmable Gate Array (FPGA). However, this is not limited thereto, and according to the implementation in the present disclosure, each of the first processing unit (not shown) and the second processing unit (not shown) may broadly encompass various processors, computational modules, etc., distinguished by characteristics (e.g., suitability for parallel tasks) required to handle operations in the learning/inference processes of artificial intelligence models.

Hereinafter, we will describe the specific functions and operations of the loading optimization device (100).

The loading optimization device (100) can acquire model information for the artificial intelligence-based target model.

Note that in the description of the embodiments of the present invention, the term 'target model' broadly includes various artificial intelligence-based deep learning models that have already been disclosed, such as Convolutional Neural Networks (CNN), Recurrent Neural Networks (RNN), Deep Belief Networks (DBN), Generative Adversarial Networks (GAN), Relation Networks (RL), Deep Neural Networks (DNN), and other deep learning networks, or those that may be developed in the future.

For example, the loading optimization device (100) may receive characteristic information of the target model from a learning database (not shown) that stores characteristic information for each of multiple deep learning models and use it as model information.

Additionally, in the description of the present embodiment, model information may include the number of input channels, the number of output channels, the size of input feature maps, kernel sizes, and layer indices of the target model. For example, the model information of the target model can be defined in the form of a feature vector with multiple dimensions, but is not limited thereto.

Furthermore, the loading optimization device (100) can define multiple partition scenarios based on the acquired model information to partition the target model into multiple blocks.

Specifically, the loading optimization device (100) can identify potential partition points for the target model based on the collected model information. In this regard, the loading optimization device (100) may explore, using the acquired model information, the layers and nodes comprising the target model, investigating (analyzing) potential points for partition as potential partition points (structural analysis of the deep learning model).

Additionally, the loading optimization device (100) can collect target data, including operation count and memory requirements for the potential partition points. The collected target data can be used to define a state for each potential partition point, as described below, and such states can be used as input in the subsequent DDPG algorithm.

Furthermore, the loading optimization device (100) can explore the optimal scenario among multiple partition scenarios through a reinforcement learning-based loading optimization model, considering the memory information of the computing device (200) to execute the target model and the operation information associated with the target model. In other words, the loading optimization device (100) can use the DDPG algorithm to learn the optimal partition method based on the model structure of the target model, considering the aforementioned memory size and operation count during this process (Block partition learning using the DDPG algorithm).

Specifically, the loading optimization device (100) can build a loading optimization model based on the DDPG (Deep Deterministic Policy Gradient) agent.

FIG. 2 illustrates an example of a DDPG (Deep Deterministic Policy Gradient) agent with an Actor-Critic structure for training the loading optimization model.

Referring to FIG. 2, the loading optimization device (100) can define the state for the DDPG agent corresponding to each potential partition point using the collected target data. Additionally, the loading optimization device (100) can define the splitting level of layers and/or nodes included in the target model for each potential partition point as actions for the DDPG agent. Furthermore, the loading optimization device (100) can design a reward function applied to the DDPG agent based on memory requirements and computational workload information.

In this regard, the DDPG algorithm can handle a continuous action space, and the loading optimization device (100) disclosed herein can define actions as continuous values that determine how many layers or nodes to split at each explored potential partition point.

Furthermore, referring to FIG. 2, the architecture of the DDPG agent may involve an actor (a in FIG. 2) that takes the state (State) as input, outputs deterministic actions, and feeds the output actions along with the state (State) into the critic (b in FIG. 2). The obtained result (Q-value) is then passed to the loss function, and the update is performed through backpropagation.

In this regard, the reward function guides the learning of the DDPG algorithm, and the loading optimization device (100) disclosed herein can design a reward function to minimize memory requirements and computation. That is, through the DDPG algorithm by the loading optimization device (100), a partitioning method can be selected where the memory requirements of the divided blocks do not exceed the memory limit of the embedded environment, while minimizing the overall computational load of the target model.

In other words, the loading optimization device (100) can use the DDPG agent to determine an optimal scenario as the partitioning scenario, ensuring that the memory requirements corresponding to each of the multiple blocks satisfy the constraints based on the memory information of the computing device (200), and minimizing the overall computational load of the target model.

Furthermore, the loading optimization device (100) can sequentially load each of the partitioned multiple blocks into the memory unit (22) of the computing device (200) according to the determined optimal scenario. In other words, the loading optimization device (100) can use the DDPG agent to partition the target model (deep learning) model into multiple blocks according to the learned optimal partitioning method and sequentially load each block into the memory unit (22) of the computing device (200) operating in the embedded environment, adapting to the characteristics of the memory unit (22) (loading of partitioned blocks).

Furthermore, the loading optimization device (100) can combine the execution results of each of the multiple blocks to derive the overall execution result of the target model. In other words, the loading optimization device (100) can execute the loaded blocks in a way that allows the combination of results to achieve the same outcome as the original target model (deep learning model).

FIG. 3 is a schematic configuration diagram of the loading optimization device for artificial intelligence models in an embedded environment according to an exemplary embodiment of the present disclosure.

Referring to FIG. 3, the loading optimization device (100) may include a acquisition unit (110), a scenario generation unit (120), an optimization execution unit (130), and a model execution unit (140).

The acquisition unit (110) can acquire model information for the artificial intelligence-based target model.

The scenario creation unit (120) can define multiple partition scenarios based on the acquired model information to partition the target model into multiple blocks.

Specifically, the scenario creation unit (120) can identify potential partition points for the target model based on the collected model information. Additionally, the scenario creation unit (120) can collect target data, including computational and memory requirements, for the identified partition points.

The optimization execution unit (130) can explore the optimal scenario among multiple partition scenarios through a reinforcement learning-based loading optimization model, considering the memory information of the computing device (200) required to execute the target model and the computational information associated with the target model.

Specifically, the optimization execution unit (130) can construct a loading optimization model based on a DDPG (Deep Deterministic Policy Gradient) agent.

In this regard, the optimization execution unit (130) can define the collected target data as corresponding states for each potential partition point for the DDPG agent. Additionally, the optimization execution unit (130) can define, for each potential partition point, the level of partitioning of layers and/or nodes included in the target model as actions for the DDPG agent. Furthermore, the optimization execution unit (130) can design a reward function for the DDPG agent based on memory requirements and computational workload information.

Moreover, according to an embodiment of the present disclosure, the optimization execution unit (130) can use the DDPG agent to determine an optimal scenario as the partition scenario in which the memory requirements corresponding to each of the multiple blocks satisfy the constraints imposed by the memory information of the computing device (200) and the total computational workload of the target model is minimized.

The model execution unit (140) can sequentially load each of the partitioned multiple blocks into the memory unit (22) of the computing device (200) according to the determined optimal scenario.

Furthermore, the model execution unit (140) can combine the results of the execution of each of the multiple blocks to derive the overall execution result of the target model.

Hereinafter, based on the detailed description above, let's briefly examine the operation flow of the present invention.

FIG. 4 is a flowchart illustrating the operation flow of the loading optimization method for artificial intelligence models in an embedded environment according to an embodiment of the present invention.

The loading optimization method for artificial intelligence models in an embedded environment, as illustrated in FIG. 4, can be performed by the loading optimization device (100) described earlier. Therefore, even if the following content is omitted, the description of the loading optimization device (100) can be similarly applied to the explanation of the loading optimization method for artificial intelligence models in an embedded environment.

Referring to FIG. 4, in step S11, the collecting unit (110) can acquire model information for the artificial intelligence-based target model.

Next, in step S12, the scenario creation unit (120) can define multiple partition scenarios based on the acquired model information to partition the target model into multiple blocks.

Specifically, in step S12, the scenario creation unit (120) can identify potential partition points for the target model based on the collected model information. Additionally, in step S12, the scenario creation unit (120) can collect target data, including operational information and memory requirements, for the identified partition points.

Next, in step S13, the optimization execution unit (130) can explore the optimal scenario among multiple partition scenarios through a reinforcement learning-based loading optimization model, taking into account the memory information of the computing device (200) required for executing the target model and the operational information associated with the target model.

Specifically, in step S13, the optimization execution unit (130) can build a loading optimization model based on a Deep Deterministic Policy Gradient (DDPG) agent.

Furthermore, according to one embodiment of the present invention, in step S13, the optimization execution unit (130) can determine the optimal scenario as a scenario in which the memory requirements for each of the multiple blocks correspond and satisfy the constraints of the computing device (200)'s memory information, while minimizing the overall computational workload of the target model.

Next, in step S14, the model execution unit (140) can sequentially load each of the multiple blocks divided according to the optimal scenario into the memory unit (22) of the computing device (200).

Furthermore, in step S15, the model execution unit (140) can combine the execution results of each of the multiple blocks to derive the overall execution result of the target model.

In the described explanation, steps S11 to S15 may be further divided or combined into additional steps, depending on the implementation in the present disclosure. Additionally, some steps may be omitted as needed, and the order of the steps may be altered.

FIG. 5 illustrates a detailed operational flowchart for constructing a reinforcement learning-based loading optimization model.

The process of constructing a reinforcement learning-based loading optimization model depicted in FIG. 5 can be carried out by the loading optimization device (100) described earlier. Therefore, even if some details are omitted below, the information provided for the loading optimization device (100) can be equally applicable to the explanation of FIG. 5.

Referring to FIG. 5, in Step S131, the optimization execution unit (130) can define the state (State) corresponding to each potential partition point for the collected target data with respect to the DDPG agent.

Next, in Step S132, the optimization execution unit (130) can define the partition level of layers and/or nodes included in the target model for each potential partition point as an action (Action) for the DDPG agent.

Subsequently, in Step S133, the optimization execution unit (130) can design a reward function applied to the DDPG agent based on memory requirements and computational load information.

In the described explanation, Steps S131 to S133 can be further divided into additional steps or combined into fewer steps according to the implementation example of the present disclosure. Additionally, some steps may be omitted as needed, and the order of the steps may be changed.

According to an embodiment of the present disclosure, the loading optimization method for an artificial intelligence model in an embedded environment can be implemented in the form of program instructions and recorded on computer-readable media. The computer-readable media may include program instructions, data files, data structures, or a combination thereof. The program instructions recorded on the media may be specifically designed and configured for the present invention or may be publicly available to computer software practitioners. Examples of computer-readable recording media include magnetic media such as hard disks, floppy disks, and magnetic tapes, optical media such as CD-ROMs and DVDs, magneto-optical media such as floptical disks, and specially configured hardware devices such as ROMs, RAMs, flash memory, and the like for storing and executing program instructions. Examples of program instructions include machine code generated by a compiler and high-level language code that can be executed by a computer using interpreters or similar tools. The mentioned hardware devices can be configured to operate as one or more software modules to perform the functions of the present invention, and vice versa.

Additionally, the loading optimization method for an artificial intelligence model in the mentioned embedded environment can also be implemented in the form of a computer program or application executed by a computer and stored on recording media.

The foregoing description is exemplary, and those skilled in the art will readily recognize that various modifications and changes may be made without departing from the scope or essential features of the technical teachings of the present disclosure. The embodiments described above are illustrative and not restrictive in all respects. For example, components described as single entities may be implemented in a distributed manner, and similarly, components described as distributed may be implemented in a combined form.

The scope of the present disclosure is defined by the claims set forth below rather than the detailed description above. All changes or modifications derived from the meaning and scope of the claims and the concept of equivalents should be construed as being within the scope of the present disclosure.

The invention claimed is:

1. A loading optimization method for artificial intelligence model in an embedded environment, comprising:

acquiring a model information for a target model which is based on artificial intelligence;

defining multiple partition scenarios based on the model information to split the target model into multiple blocks, and exploring an optimal scenario among the multiple partition scenarios through a reinforcement learning-based loading optimization model in consideration of memory information of a computing device for executing the target model and calculation amount information associated with the target model.

2. The loading optimization method according to claim 1, wherein the loading optimization model is learned based on a Deep Deterministic Policy Gradient (DDPG) agent.

3. The loading optimization method according to claim 2, wherein the defining multiple partition scenarios is identifying potential partition points for the target model based on the model information, and collecting target data for the identified potential partition points, which includes computational workload information and memory requirements.

4. The loading optimization method according to claim 3, wherein the exploring an optimal scenario is determining the optimal scenario as the partition scenario which the memory requirements satisfy the constraints imposed by the memory information for each of the multiple blocks, and minimizes the overall computational workload of the target model.

5. The loading optimization method according to claim 4, wherein the exploring an optimal scenario includes:

- defining the target data as a state for the DDPG agent, corresponding to the potential partition points; and
- defining for each potential partition point, the level of partitioning for layers and/or nodes within the target model as an action for the DDPG agent.

6. The loading optimization method according to claim 5, wherein a reward function applied to the DDPG agent is designed based on the memory requirements and the computational workload information.

7. The loading optimization method according to claim 1, further comprising:

- sequentially loading each of the multiple blocks, partitioned according to the optimal scenario, onto the memory units of the computing device; and
- deriving the overall execution result of the target model by combining the execution results of each of the multiple blocks.

8. The loading optimization method according to claim 1, wherein the computing device is a device operates in an embedded platform environment.

9. A loading optimization apparatus for artificial intelligence model in an embedded environment, comprising:

- an acquisition unit which acquires a model information for a target model which is based on artificial intelligence;
- a scenario generation unit which defines multiple partition scenarios based on the model information to split the target model into multiple blocks; and
- an optimization execution unit which explores an optimal scenario among the multiple partition scenarios through a reinforcement learning-based loading optimization model in consideration of memory information of a computing device for executing the target model and calculation amount information associated with the target model.

10. The loading optimization apparatus according to claim 9, wherein the loading optimization model is learned based on a Deep Deterministic Policy Gradient (DDPG) agent.

11. The loading optimization apparatus according to claim 10, wherein the scenario generation unit identifies potential partition points for the target model based on the model information, and collecting target data for the identified potential partition points, which includes computational workload information and memory requirements.

12. The loading optimization apparatus according to claim 11, wherein the optimization execution unit determines the optimal scenario as the partition scenario which the memory requirements satisfy the constraints imposed by the memory information for each of the multiple blocks, and minimizes the overall computational workload of the target model.

13. The loading optimization apparatus according to claim 12, wherein the optimization execution unit defines the target data as a state for the DDPG agent, corresponding to the potential partition points, and defines for each potential partition point, the level of partitioning for layers and/or nodes within the target model as an action for the DDPG agent.

14. The loading optimization apparatus according to claim 13, wherein a reward function applied to the DDPG agent is designed based on the memory requirements and the computational workload information.

15. The loading optimization apparatus according to claim 9, further comprising:

- a model execution unit which sequentially loads each of the multiple blocks, partitioned according to the optimal scenario, onto the memory units of the computing device, and derives the overall execution result of the target model by combining the execution results of each of the multiple blocks.

* * * * *